Oct. 26, 1965  R. HASTINGS, JR., ETAL  3,213,967
LIFT TRUCK
Original Filed June 4, 1956  8 Sheets-Sheet 1

INVENTORS.
RUSSELL HASTINGS JR.
ELMER R. BACKOFEN
BY
ATTYS.

Oct. 26, 1965     R. HASTINGS, JR., ETAL     3,213,967
LIFT TRUCK

Original Filed June 4, 1956            8 Sheets-Sheet 2

INVENTORS.
RUSSELL HASTINGS JR.
ELMER R. BACKOFEN
BY
ATTYS.

Oct. 26, 1965   R. HASTINGS, JR., ETAL   3,213,967
LIFT TRUCK
Original Filed June 4, 1956   8 Sheets-Sheet 3

INVENTORS.
RUSSELL HASTINGS JR.
ELMER R. BACKOFEN
BY
ATTYS.

Oct. 26, 1965  R. HASTINGS, JR., ETAL  3,213,967
LIFT TRUCK
Original Filed June 4, 1956  8 Sheets-Sheet 4
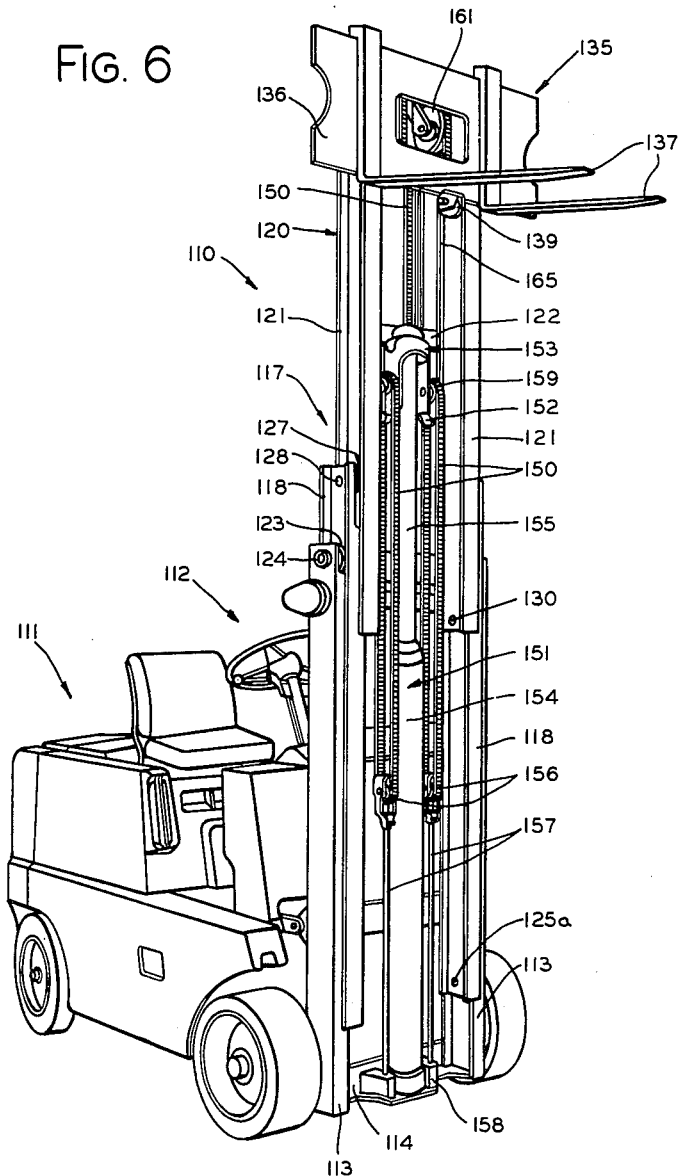
INVENTORS.
RUSSELL HASTINGS JR.
ELMER R. BACKOFEN
BY
ATTYS.

Oct. 26, 1965  R. HASTINGS, JR., ETAL  3,213,967
LIFT TRUCK
Original Filed June 4, 1956  8 Sheets-Sheet 5

INVENTORS.
RUSSELL HASTINGS JR
ELMER R. BACKOFEN
BY
ATTYS.

Oct. 26, 1965 R. HASTINGS, JR., ETAL 3,213,967
LIFT TRUCK
Original Filed June 4, 1956 8 Sheets-Sheet 6
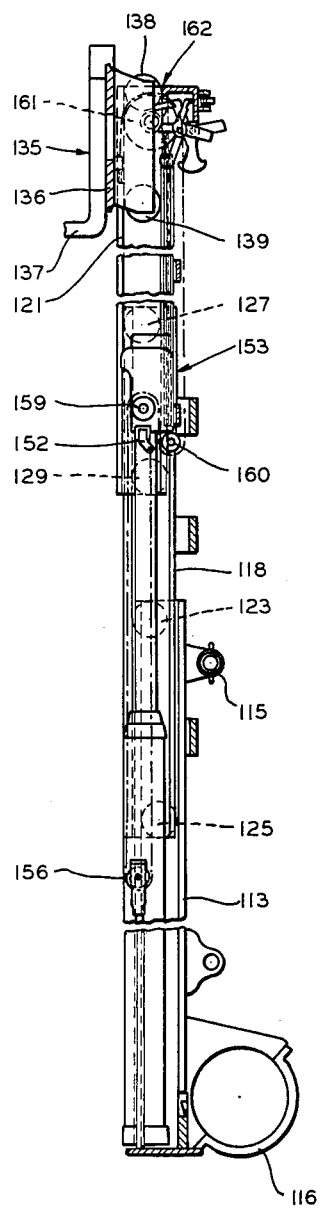
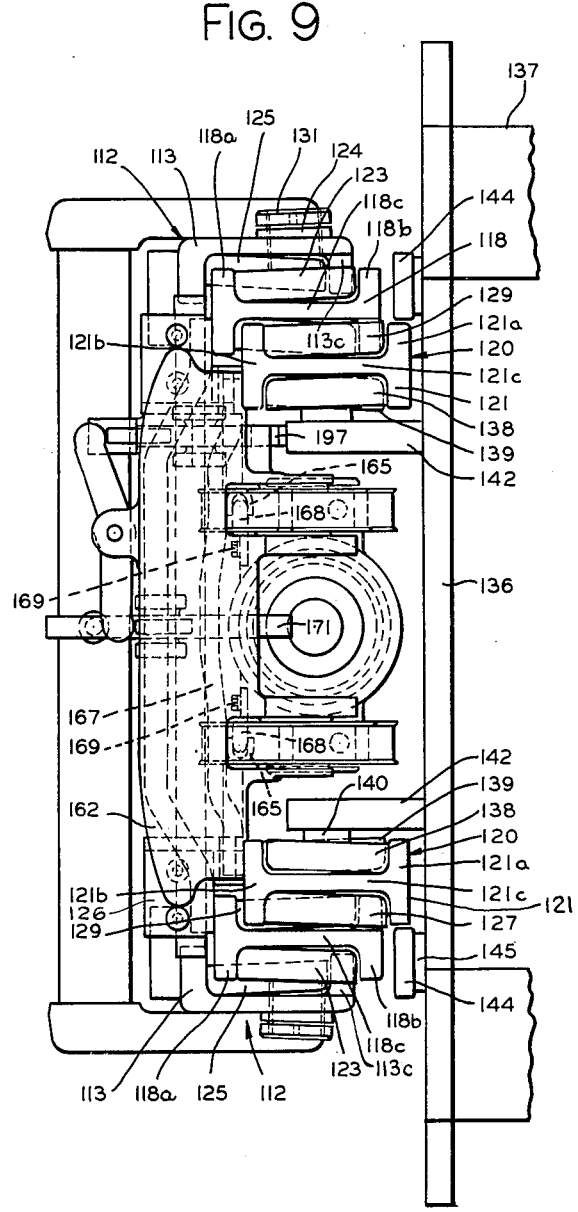
INVENTORS.
RUSSELL HASTINGS JR.
ELMER R. BACKOFEN
BY
ATTYS.

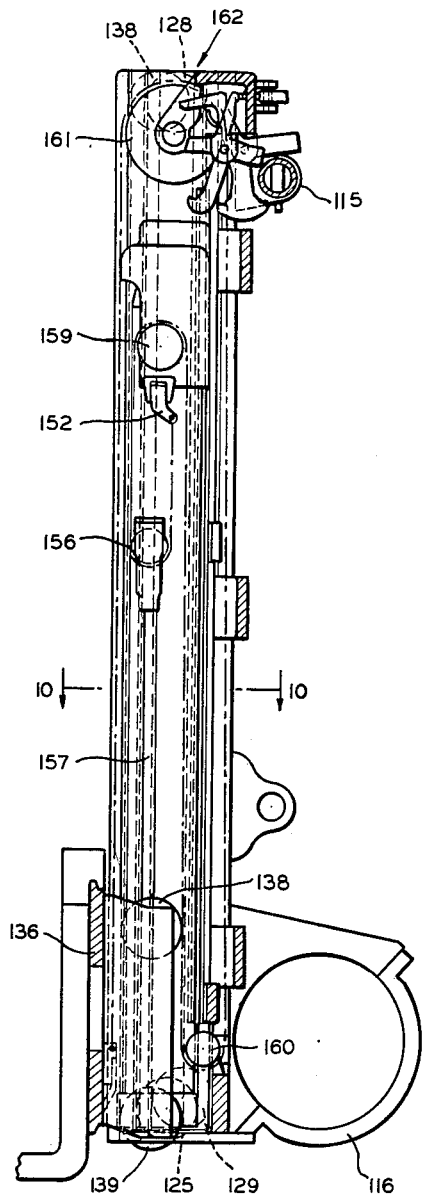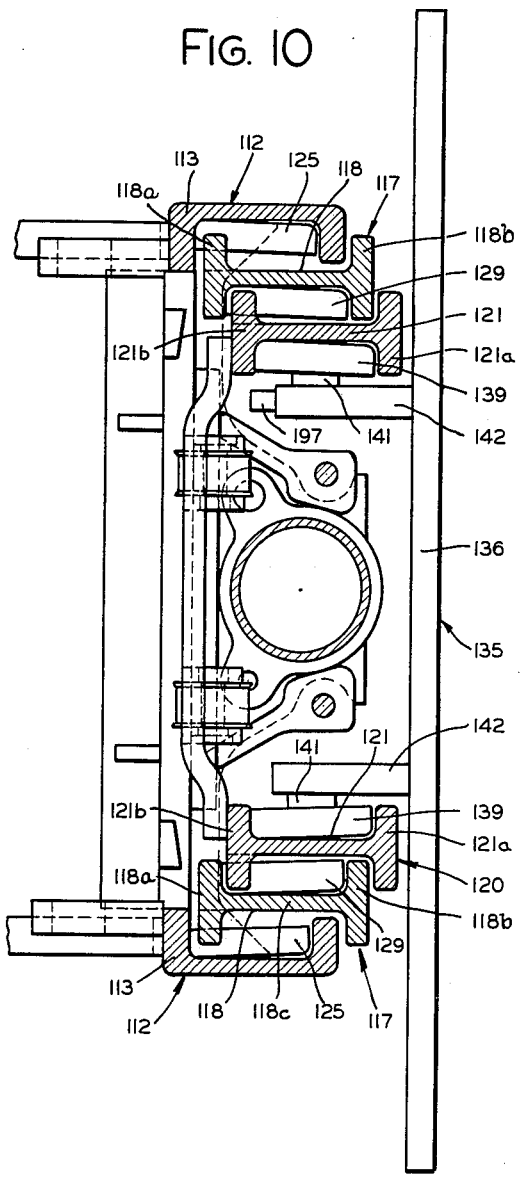

Oct. 26, 1965 R. HASTINGS, JR., ETAL 3,213,967
LIFT TRUCK
Original Filed June 4, 1956 8 Sheets-Sheet 8

INVENTORS.
RUSSELL HASTINGS JR.
ELMER R. BACKOFEN
BY
ATTYS.

United States Patent Office 3,213,967
Patented Oct. 26, 1965

3,213,967
LIFT TRUCK
Russell Hastings, Jr., and Elmer R. Backofen, Battle Creek, Mich., assignors to Clark Equipment Company, a corporation of Michigan
Continuation of application Ser. No. 760,744, Sept. 12, 1958, which is in turn a continuation-in-part of Ser. No. 589,156, filed June 4, 1956 (now abandoned), and of Ser. No. 589,162, filed June 4, 1956, now Patent No. 2,906,373, Sept. 29, 1959. This application May 18, 1961, Ser. No. 111,070
28 Claims. (Cl. 187—9)

This application is a continuation of our application Serial No. 760,744, filed September 12, 1958 for Lift Truck (now abandoned) and which application Serial No. 760,744 is a continuation-in-part of our application Serial No. 589,162, filed June 4, 1956 for Extensible Upright for Lift Trucks, now Patent No. 2,906,373, dated September 29, 1959, and of our application Serial No. 589,156, filed June 4, 1956 for Lift Trucks (now abandoned).

The invention hereindescribed relates generally to industrial lift trucks, and more specifically, to an improved extensible upright or mast assembly used in supporting load engaging means, such as a lift fork, employed with industrial lift trucks to which the present invention pertains and which are generally employed for elevating, storing, transporting and otherwise handling merchandise and other load materials. The load engaging fork is normally carried by a vertical extensible mast or upright structure located at the forward end of the industrial vehicle. Such fork engages the load and is thereafter raised to desired elevation in which position the same is normally transported to a desired location and thereat unloaded. The upright mast for supporting such a load engaging fork means is normally secured in a stationary position and preferably includes means for its vertical extension so as to maintain minimum vertical retracted height while at the same time providing maximum elevation of the load engaging means.

In general, such extensible upright assemblies or masts of previously known construction, have included a stationary assembly fixed to the industrial lift truck and a movable section including either a single or a pair of slidingly extensible or telescopingly arranged rail members movable relative to the stationary assembly. Such previous structures have maintained minimum retracted height and provided means for elevating the load engaging means above the normal vertical dimension of the stationary mast portion. The present invention seeks to improve the general features and concepts of the extensible mast structure.

It is an object of the present invention to provide a mast structure embodying a plurality of relatively movable mast sections in telescoping relation to one another, and in which such sections are in nested relation to provide a compact arrangement of such components.

A further object is to provide a mast structure as aforenoted in which at least one of the mast sections is of substantially I-shape cross-section and having one flange nested in a channel of another of the mast sections and its other flange lying outwardly of the latter mast section.

A further object is to provide a load lifting frame of the character noted having stationary and extensible uprights each having flanges defining channels therebetween, and in which cut-outs are provided in certain of the flanges of the uprights to provide for guide rollers extending through the cut-outs in rolling engagement with the flanges of the channels.

A further object is to provide a load lifting mechanism having stationary and extensible uprights as last noted in which the cut-outs in the uprights permit the guide rollers on each of the uprights to move laterally into the channels of the uprights when the uprights are in their fully extended positions with the cut-outs in alignment with the rollers so as to permit the assembly and disassembly of the uprights without removing the rollers.

A further object is to provide load lifting mechanism according to the aforementioned objects in which the load lifting mechanism may comprise a first stationary upright and a first extensible upright movable relative thereto.

A further object of the invention is to provide a load litfing mechanism according to the foregoing objects embodying a second extensible upright movable relative to the first extensible upright.

A further object is to provide a load lifting mechanism having a pair of spaced apart stationary uprights and a pair of movable extensible uprights and in which the extensible uprights have portions projecting forwardly of the stationary uprights, and load carriage means movable relative to the extensible uprights together with means for the load carriage means engaging the forwardly projecting portions of the extensible uprights to provide, upon any eccentric loading of the carriage, in the side thrust thereof being at least primarily imposed on the extensible upright adjacent the minor portion of the load, and in the forward thrust being at least primarily imposed on the extensible upright adjacent the major portion of the load.

A further object is to provide a load lifting mechanism as last noted in which the means for distributing the thrust of an eccentric load on the carriage includes only a pair of thrust rollers mounted on the carriage.

A further object is to provide a load lifting mechanism of the character noted in which a pair of rollers are provided for a stationary upright adjacent the top thereof, and a pair of rollers are provided for an extensible upright near the lower ends thereof with such rollers all being cocked with respect to the uprights, and the rollers on the stationary uprights being cocked in a direction opposite to the direction of the cocking of the rollers on the extensible upright, and in which the load carriage embodies upper and lower guide rollers with such guide rollers all being cocked with the upper guide rollers being cocked in a direction opposite to the direction of cocking of the lower guide rollers.

Specifically, and in accordance with the foregoing objects the invention in a preferred form thereof contemplates the provision of a mast structure comprising laterally spaced apart channel-shaped stationary upright secured to the lift truck. Such uprights receive a laterally spaced apart extensible upright, or uprights which are I-shaped in cross-section. The load-carriage is arranged to move up and down in an extensible upright and is provided with two pairs of rollers, one pair (an upper and lower roller) engaging the inner sides of an extensible I-shaped upright. In the use of a single extensible upright, the stationary uprights are provided with rollers adjacent their top, while the single extensible upright is provided with rollers near its bottom. These sets of rollers take the forward bending stress on the mast structure when the extensible upright, or uprights, is raised and lowered. The upper rollers on the load-carriage are slightly cocked oppositely to the lower rollers on the carriage and the rollers on the stationary and extensible uprights are slightly cocked oppositely to each other, i.e., turned at an angle with respect to a longitudinal axis through the truck. In both cases, this angle is approximtaely 2°. That is also true in the use of a pair of extensible sections, but in this latter case, the intermediate section has rollers adjacent its upper end, and the innermost section has rollers adjacent its lower end. This arrangement of rollers provides for better wear characteristics on the rails on which the rollers operate. To provide lateral stability of the carriage, the latter is equipped with a pair of rollers which engage the flanges of the extensible upright. It is contemplated employing only two of these rollers. The reason that two rollers only will suffice is that a lower roller on the carriage, on the same side of the truck as a roller on the carriage engaging the flange of the extensible upright, provides a couple to resist forces tending to tilt the carriage sideways. The aforementioned stationary and extensible uprights comprise end flanges having a channel between such end flanges and in which an end flange of one of the uprights is disposed to lie within a channel of the other upright to provide a compactly nested and telescopic arrangement of such uprights.

The aforementioned end flanges of the stationary and extensible uprights may be provided with cut-outs to permit the guide rollers in each upright to move laterally into the channel of the other upright when the uprights are in their fully extended positions with the cut-outs in alignment with the rollers so as to permit the assembly and disassembly of the uprights without removing the rollers. The construction noted affords for the provision of large diameter rollers providing for taking up thrust over a large area and eliminating flaking of the uprights under high loading conditions.

Further the invention seeks to improve the general features and concepts of the extensible mast structure by providing an increased maximum vertical extension while maintaining minimum vertical height of the stationary mast portion. Broadly speaking, one form of the improvide mast of the invention embodies a pair of extensible sections, telescopingly arranged and nested one within the other and with one of said pair of extensible sections in telescopic and nested relation with respect to the stationary portion of the mast.

Other features and advantages of the invention will in part be obvious and in part will hereinafter appear and they consist generally in the features of construction, combination of elements, and arrangements of parts, which will be exemplified in the construction to be described and of which the scope of application will be indicated in the appended claims.

In the accompanying drawings, in which is shown the preferred illustrative embodiment of the invention:

FIGURE 6 is a perspective view showing the three-part mast assembly of the invention in association with a conventional industrial lift truck;

FIGURE 9 is a top plan view of the same;

FIGURE 10 is a cross-sectional view of the same taken at line 10—10 of FIGURE 11 and looking in the direction of the arrow thereon;

FIGURE 11 is a longitudinal cross-sectional view of our new mast structure showing the same in retracted position and taken substantially along line 11—11 of FIGURE 7 and looking in the direction of the arrows thereon;

FIGURE 12 is an additional longitudinal cross-sectional view, similar to FIGURE 11, showing the mast structure of our invention in a fully extended condition;

Figure 1:
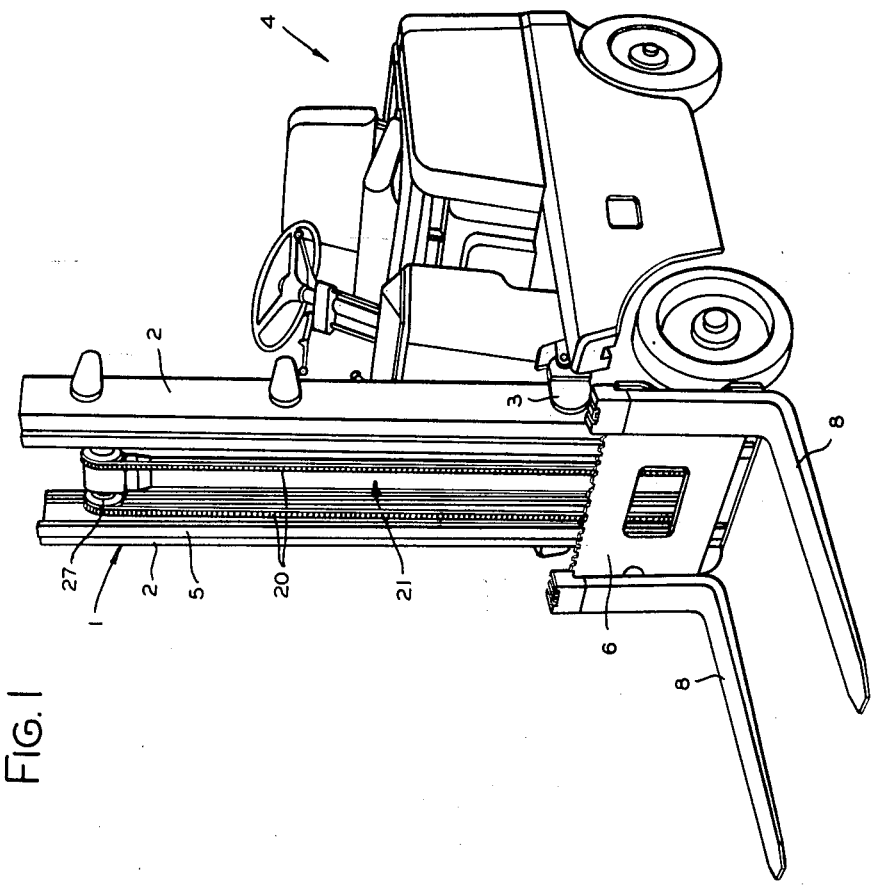
FIGURE 1 is a perspective view showing the load-carriage lowered to the bottom of the inner or extensible frame.

Referring now in detail to the drawings, and particularly to FIGURES 1 through 5 thereof, the mast 1, which, as here shown, comprises a pair of laterally spaced channel members 2 firmly braced together to form an upright frame-like structure, has the connections 3 by which it may firmly be secured to a base, in this case a truck 4. This truck embodies operating parts including a prime mover such as an internal combustion engine, equipment for providing hydraulic fluid under pressure, and suitable driving and control mechanisms.

Channel members 2 face each other and are adapted to receive an extensible upright in the form of laterally spaced I-beams 5, such beams also being suitably cross-braced to form a frame-like structure. The extensible upright 5, is, of course, adapted for longitudinal movement with respect to stationary upright 2, in a manner hereinafter more fully described.

Figure 3:
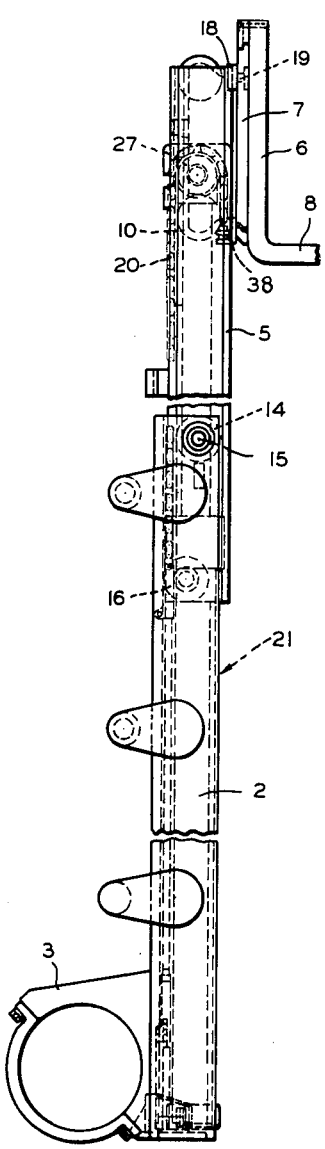
FIGURE 3 is a side elevational view.
Figure 2:
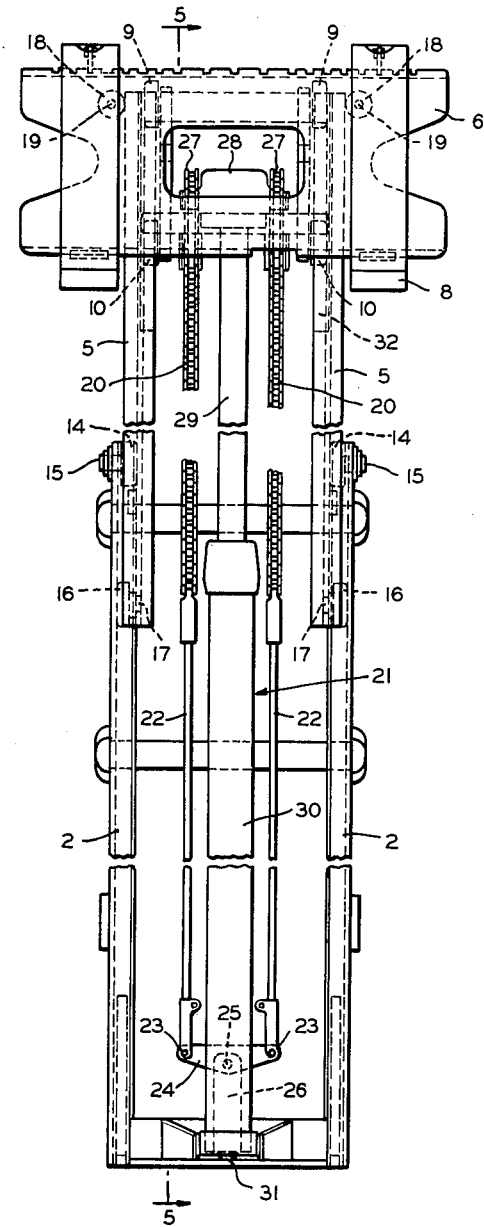
FIGURE 2 is a front elevation of the load-lifting mechanism.
Figure 4:
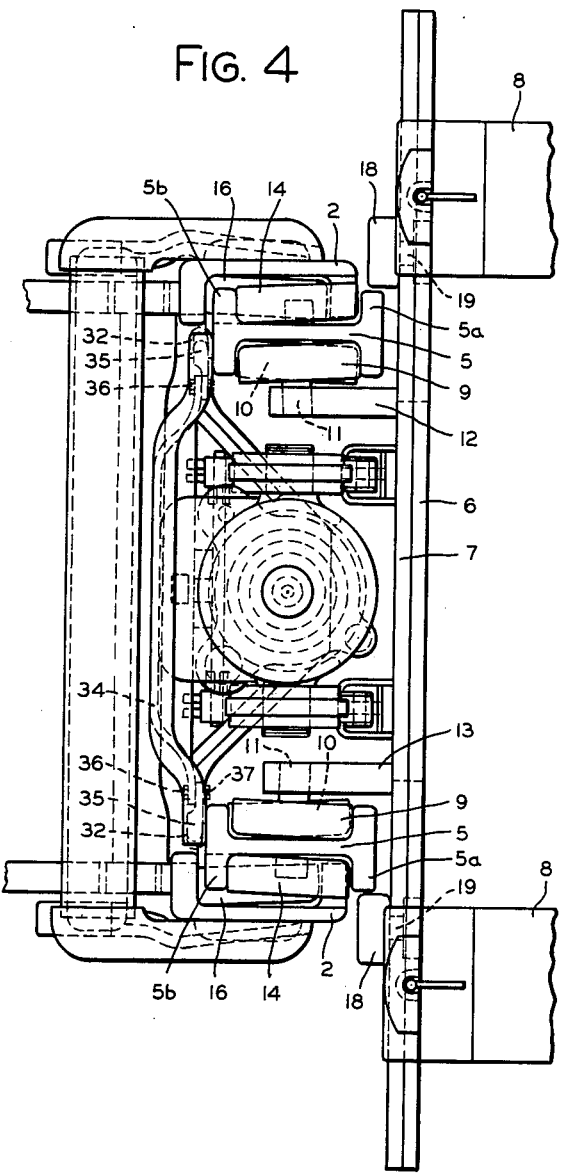
FIGURE 4 is a top plan view.

The load-carriage 6, which includes, as seen in FIGURE 3, an apron 7 and lifting arms or forks 8, is of the conventional type customarily used in industrial lift trucks, stackers, and other related mechanisms, and is fitted to said extensible upright 5 so as to be movable longitudinally thereof. It will be noted that the carriage 6, as best seen in FIGURES 2 and 4, is provided with two pairs of rollers, two rollers 9 being positioned adjacent the top of the carriage and two rollers 10 being positioned adjacent the bottom of the carriage. These rollers, as illustrated in FIGURE 4, are carried by stub shafts 11 fixed to laterally spaced apart flanges 12-13, suitably fixed to the rear face of apron 7 to extend rearwardly therefrom toward the I-beams 5. Each flange supports an upper roller 9 and a lower roller 10, and each of such pairs of rollers engages the inner side of one of the I-beams 5, between the flanges 5a and 5b thereof. The carriage 6 is thus fitted for longitudinal movement with respect to the extensible upright 5. It will be noted that the upper and lower rollers of the carriage are cocked slightly, i.e., turned at an angle with respect to a longitudinal axis through the truck, with the upper rollers turned in one direction and the lower rollers turned in the opposite direction. In the embodiment of the invention shown, the upper rollers 9 are cocked so that, as viewed in plan in FIGURE 4, there is a clearance between the upper roller 9 and a portion of the web of I-beam, as shown, and a clearance between the lower roller 10 and a portion of the web of I-beam 5.

Figure 5:
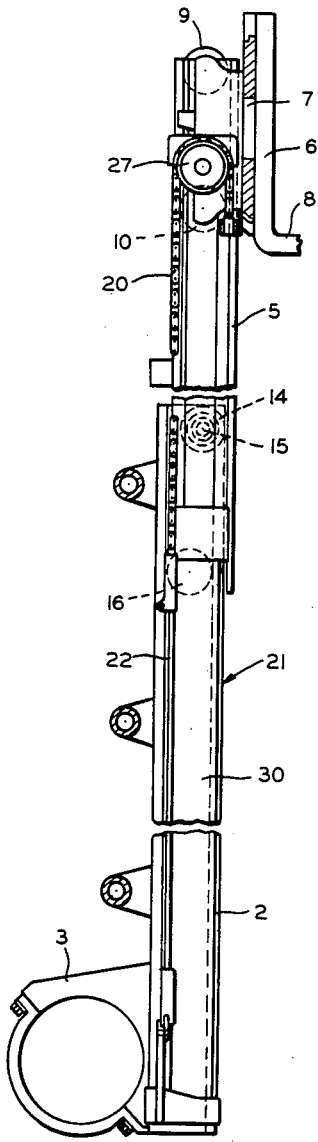
FIGURE 5 is a vertical sectional view taken substantially along the plane of the line 5—5 of FIGURE 2.

Each channel member 2, as best seen in FIGURES 2 and 3, is also provided with a roller 14 located adjacent the top thereof on a stub shaft 15 suitably fixed to the uprights 2. Also, extensible uprights 5 each have a roller 16 located adjacent the bottom thereof on a stub shaft 17 suitably fixed to the uprights 5. The rollers 14, of course, ride in the outer side of I-beam 5 between the flanges 5a and 5b, while the rollers 16 ride in the channel uprights 2. Rollers 14 are cocked to leave a clearance therebetween and the flange 5a of I-beam 5, while rollers 16 are cocked in a direction opposite to that of rollers 14. These sets of rollers 14 and 16 take the forward bending stress on the mast structure as the extensible uprights are raised and lowered. In FIGURES 2, 3 and 5 of the drawings, the rollers 14 and 16 appear close together, but this is for the reason that the extensible upright 5 is near its upper position. When the extensible upright 5 is in its lowered position, roller 16 is at a maximum distance from roller 14. Rollers 14 and 16 are also cocked in opposite directions with respect to each other and to a longitudinal axis through the truck which arrangement serves an additional purpose hereinafter described. In all cases the rollers are cocked on a 2° angle. The cocking of the rollers provides better wear characteristics on the rails on which they ride. Also, it should be observed that the aforedescribed arrangement of nesting I-beams 5 in channel sections 2 in combination with the cocked roller arrangement affords a high degree of compactness for the mast construction of this invention.

To provide lateral stability of the carriage 6, it is equipped with two rollers 18. These rollers are each carried on a stub shaft 19 fixed to and extending from the rear face of apron 7. Such shafts are disposed adjacent the top of the apron 7 in line with stub shafts 11 of rollers 10 and are so located on the apron that one of the rollers will contact and ride one side edge of the flange 5a of each of the I-beams 5. It will be noted that only two rollers 18 are employed, instead of the gerater number heretofore employed in existing structures. Further, rollers 18, by being disposed to engage the outer edges of flanges 5a, resist outward thrust of rollers 9 and 10 on I-beams 5, which would tend to spread or widen the lateral spacing of the I-beam 5 whenever the forks 8 are loaded and are elevated or lowered therealong, and particularly when the major portion of a load is carried by one of the forks. Additionally, as already noted, the rollers 18 are positioned adjacent or near the upper edges of apron 7 so that if, for example, a load should be disposed in major amount on one of the forks 8 the resulting longitudinal or forward bending stress is primarily sustained by the I-beam 5 in proximity of the fork carrying such load, whereas the lateral thrust resulting from the turning moment on the fork carriage will be primarily resisted by the couple acting on the other I-beam 5 through rollers 10 and 18 associated with the latter I-beam.

Carriage 6 and the extensible uprights 5 are operated through the medium of a pair of chains 20 and hydraulic mechanism 21. Each chain 20 is fastened at one end to one end of a rod 22, the opposite end of the rod, as best seen in FIGURE 2, being pivotally secured at 23 to one end of an equalizer bar 24. Such bar 24 is pivotally mounted intermediate its ends at 25 upon a support 26, which support, in turn is fixedly secured to the base of the load-lifting mechanism to project upwardly therefrom. The opposite end of each chain is trained over a sprocket or sheave 27 rotatably mounted on a crosshead 28, the end of the chain being suitably secured to the rear lower end of the load-carriage 6 at 33.

Crosshead 28 is carried at one end of a piston rod 29, the opposite end of the rod engaging in a hydraulic cylinder 30. Preferably, the hydraulic cylinder is mounted on a spherical portion 31 so that it is relatively free for effective and efficient operaiton relaitve to the mast structure and under various conditions of loading and use.

To guide the crosshead in its movement with respect to the mast structure, guide means in the form of laterally spaced channel members 32 are provided, which are rigidly secured to uprights 5 with the channel openings facing each other. The crosshead 28 as best seen in FIGURE 4, has a horizontal bar 34 suitably secured thereto, the opposite ends of which have guide members 35 suitably secured to bar 34 by means of the bolt and nuts 36 and 37, respectively. Upon upward movement of piston 29, members 35 will slide along in channels 32 to guide the crosshead.

In operation of the device, fluid under pressure is admitted to cylinder 30 causing upward movement of piston 29. Through the medium of chains 20 and sprockets 27, the load-carriage 6 is immediately caused to rise in the uprights 5 being guided therein by the carriage rollers 9, 10 and 18. Preferably, latch means of known construction cooperates with stationary uprights 2 and extensible uprights 5 to secure them together against relative movement until the carriage 6 reaches its upper limit of movement in the uprights 5. Such latch means may be of the type shown in the patent to A. W. Gunning, No. 2,514,052, granted July 4, 1950. At such time the latch means is operated ot release the stationary uprights from the extensible uprights, whereupon the latter are moved upwardly in guided relation to the stationary uprights under the influence of piston 29, chains 20 and sprockets 27. It will be understood, of course, that during such relative movement of uprights 2 and 5, they will be guided by the rollers 14 and 16, previously described. In the lowering of the device, the uprights 5 will first descent with respect to the uprights 2 until the former are in their lowermost position with respect to uprights 2 and latched thereto. Upon continued downward movement of piston 29, the load carrier will descend relative to uprights 5 until it reaches its lowermost point in respect thereto.

Figure 7:
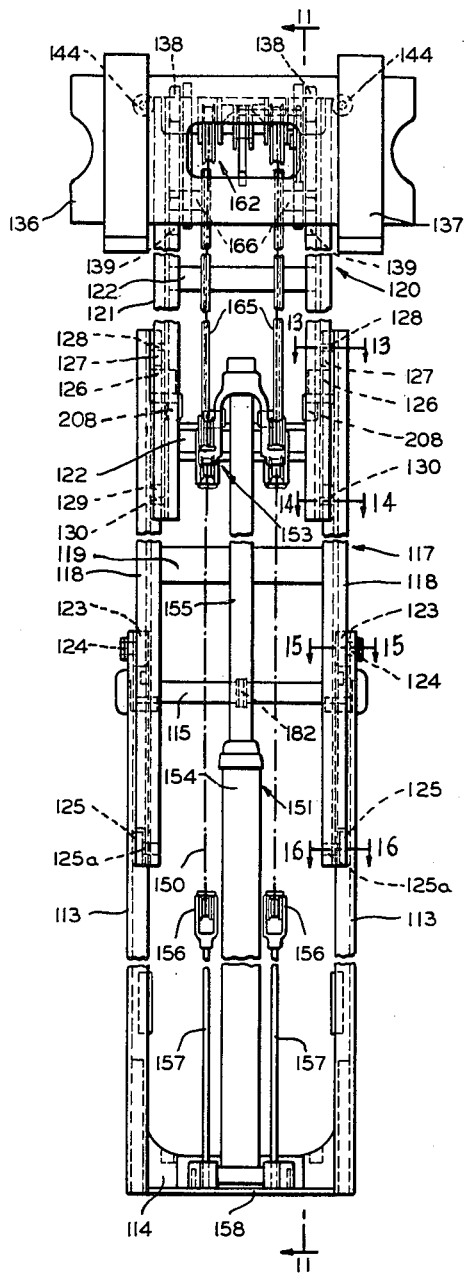
FIGURE 7 is a front elevational view of the mast structure shown in FIGURE 6.
Figure 8:
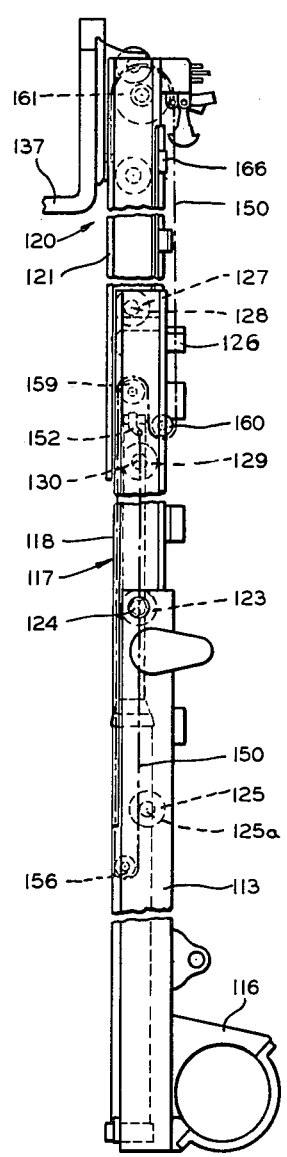
FIGURE 8 is a side elevational view of the mast structure shown in FIGURE 6.

Turning now to FIGURES 6 through 18 of the drawing, we have shown another embodiment of our invention, in which a modified form of mast assembly, indicated generally at 110, is used in conjunction with a conventional industrial lift truck 111 The mast assembly 110 includes a stationary section 112 comprising a pair of laterally spaced apart channel members 113, 113 suitably cross-braced adjacent their ends, as best seen in FIGURE 7, by members 114 and 115 to form stationary upright frame section having, as shown in FIGURE 8, a mounting means 116 at its lower end by which such is firmly secured ot a base or support, such as the industrial truck 111. This truck also embodies operating mechanism familiar in the art, including a prime mover, such as an internal combustion engine, equipment providing hydraulic fluid under pressure, suitable driving and control mechanism, and means transmitting pressurized fluid through the control mechanisms to a means for extending and retracting the new mast or upright assembly 110, as will now be set forth.

The channel members 113, substantially C-shaped in cross-section, oppose each other and are arranged to receive an intermediate mast section 117 formed of two laterally spaced I-beams 118, 118; such beams being suitably cross-braced, as shown in FIGURE 7, by members 119 to form rigid rectangular structure Such intermediate upright section 117 is roller supported and arranged for longitudinal movement relative to the stationary upright frame members 113, 113, as will be hereinafter described.

In addition to the intermediate extensible section 117, an inner extensible mast section 120 is also included; such comprising a pair of laterally spaced I-beam members 121, 121, cross-spaced, as best seen in FIGURE 7, by two brace members 122, 122 to form a rectangular frame structure, similar to extensible section 112 and telescopingly arranged inwardly of the I-beams 118, 118 of the latter section.

Figure 15:
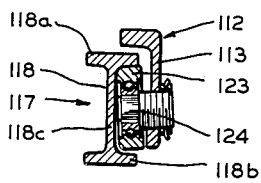
FIGURE 15 is a detail cross-sectional view taken along the line 15—15 of FIGURE 7 looking in the direction indicaed by the arrows.
Figure 15A:
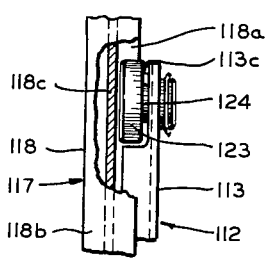
FIGURE 15A is an elevational view, partially broken away, of the parts shown in FIGURE 15.

The intermediate extensible section 117 is supported by two sets of rollers, one set 123, 123 being carried, as best shown in detail in FIGURES 15 and 15A at the upper end of the C-channels 113, 113 of the stationary upright section 112 on stub shafts 124, 124.

Figure 16:
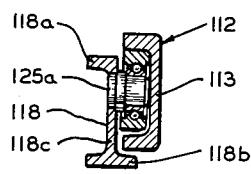
FIGURE 16 is a detail sectional view taken along the line 16—16 of FIGURE 7 looking in the direction indicated by the arrows.
Figure 16A:
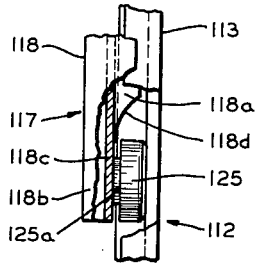
FIGURE 16A is an elevational view, partially broken away, of the parts shown in FIGURE 16.
Figure 18:
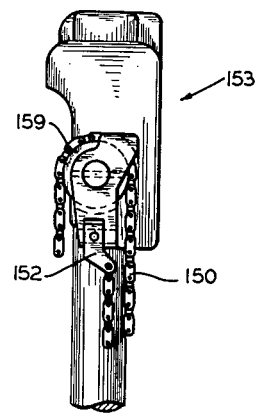
FIGURE 18 is a side elevation of the parts shown in FIGURE 17.

As generally shown in FIGURES 7, 9 and 10 and in detail in FIGURES 16 and 16A, the second set of rollers 125, 125 rotate on stub shafts 125a, 125a at the lower end of I-beams 118, 118 of intermediate mast section 117.

Figure 13:
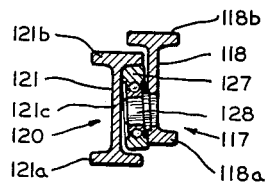
FIGURE 13 is a detail cross-sectional view taken substantially along the line 13—13 of FIGURE 7 looking in the direction indicated by the arrows.
Figure 13A:
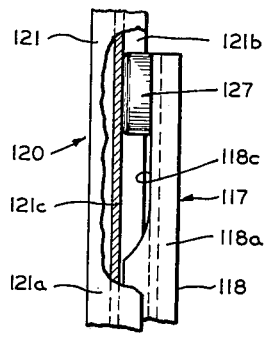
FIGURE 13A is an elevational view, partially broken away, of the parts shown in FIGURE 13.

Rollers 123 ride between flange portions 118a and 118b of beams 118 along the outside face of web wall 118c thereof. As shown in FIGURES 15 and 15A, the upper end portions of channels 113 adjacent flange 118b of I-beams 118 are cut away as at 113c to dispose rollers 123 as aforementioned. Rollers 125, 125 ride in the recess of the C-channels 113. It will also be seen upon reference to FIGURES 16 and 16A that the lower portions of flanges 118a of I-beams 118 are cut away as at 118d to afford positioning of rollers 125 in the recesses of channels 113. Such two sets of rollers 123 and 125 serve to support the intermediate upright section 117 for longitudinal movement relative to the stationary upright section 112. The I-beams 118, 118 also carry, on their rearward flanges and adjacent their upper ends, as shown in FIGURES 7, 8 and 9 a pair of stop blocks 126, 126 for purposes which will appear presently Additional sets of rollers 127, 127 on stub shafts 128, 128 extend inwardly of the upper ends of intermediate I-beams 118, 118, the flanges 118a of which, as best shown in FIGURES 13 and 13A are cut away as at 118c to provide for engagement of rollers 127, 127 with the outer face of web walls 121c of I-beams 121, between flange portions 121a and 121b thereof to support the inner extensible section 120.

Figure 14:
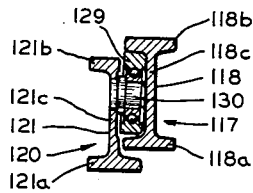
FIGURE 14 is a detail sectional view taken along the line 14—14 of FIGURE 7 looking in the direction indicated by the arrows.
Figure 14A:
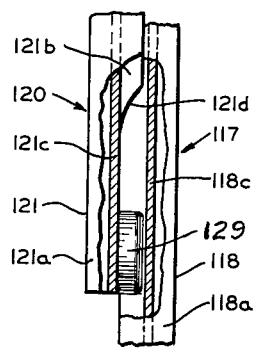
FIGURE 14A is an elevational view, partially broken away, of the parts shown in FIGURE 14.
Figure 17:
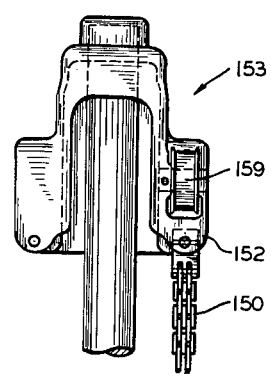
FIGURE 17 is a detail elevational view showing the manner in which lifting chains are secured to the piston cross-head assembly for effecting raising and lowering of the mast.

The inner section 120 likewise carries a set of rollers 129, 129 on shafts 130, 130 (see FIGURE 14) disposed adjacent the lower ends of I-beams 121. Flanges 121b of beams 121, as best shown in FIGURES 14 and 14A are cut away as at 121d to provide for engagement of the rollers 129, 129, with flange portions 118a and 118b, adjacent the innermost face of web wall 118c of the I-beam members 118, 118; the latter being associated with intermediate slide section 117.

From the foregoing, it will be understood and appreciated that the intermediate and inner extensible mast sections 117 and 120 are supported by roller sets 123–125 and 127–129, respectively, such that both the intermediate and inner sections are movable relative to the outer or stationary upright section 112 to provide upright mast assembly having multiple extensible sections. As best seen in FIGURE 7 the aforementioned stop block 126, 126 adjacent the upper ends of I-beams 118, 118 of the intermediate mast section 117 in the fully extended position of inner mast section 120 are abutted by stop blocks 208, 208 adjacent the lower ends of the I-beams 121 of inner mast section 120, and such abutting relation of the stop blocks prevents alignment of the cut-away portions 118c and 121d (see FIGURE 13A and 14A of the intermediate and inner mast sections, respectively.

It will be noted that the rollers 123 carried at the upper end of the stationary uprights channel members 113 are canted slightly or toe outwardly from a true transverse relation with respect to the web wall 131 of their associated C-channel members 113. Likewise, the rollers 127 carried on the intermediate sliding mast section 117 for engaging the outside of the I-beam members 121 at flanges 121a and 121b of the inner slidable section 120 are canted on axes paralleling the axis of rotation for rollers 123. This relationship may best be understood by examining FIGURE 9 of the drawings. The offsetting of the axis of rotation for rollers 123 and 127, as defined by their respectively associated stub shaft portions 124 and 128 is approximately 2° with respect to a true transverse relationship with a longitudinal axis taken through the truck 111. On the other hand, the sets of rollers 125 and 129 located adjacent the lower ends of the mast sections 117 and 120, respectively, are canted in an opposite direction, as best viewed in the cross-sectional view of FIGURE 10. These sets of rollers 125 and 129 take the forward bending stress of the mast structure as the extensible upright sections are raised and lowered, while the reverse is true of the upper disposed sets of rollers 123 and 127. In all cases, the rollers are cocked at a 2° angle with respect to true transverse relation with their associated mast channel members or beams 113, 118 or 121, as the case may be. Thought of in a different manner, such rollers are canted at 2° with respect to a plane disposed transversely to the longitudinal axis of the truck 111.

A load carriage or load engaging means 135 including an apron 136 and lifting or fork arms 137 is provided; such being a conventional type customarily used in industrial lift trucks, stackers and other related mechanisms of this class. Such load carriage or load engaging means is fitted to the inner extensible section 120 so as to be movable longitudinally therealong. In this regard, carriage 135, as shown in FIGURES 7, 9 and 10, is provided with two sets of rollers 138 and 139; the roller set 138 being positioned adjacent the upper end of the carriage and the roller set 139 being positioned adjacent the lower end thereof. These rollers are carried by stub shafts 140 and 141, respectively, fixed to laterally spaced apart flanges 142, 142 located on and projecting from the rear face of apron 136 to extend rearwardly therefrom toward and inwardly of the I-beams 121. Each flange member carries an upper roller 138 and a lower roller 139, with such rollers thereby engaging the inner face of the central web wall 121c of one of the I-beams 121 between flange portion 121a and 121b. Carriage 135 is thus fitted for longitudinal movement with respect to the extensible upright section 120. It will be noted that the upper and lower rollers of the carriage assembly are cocked slightly, or that is, turned at an angle with respect to a longitudinal axis taken through the truck, similar to the cocking or canting of the previously described sets of rollers of the mast structure. In particular, the upper rollers 138 are turned in one direction and the lower rollers 139 are turned in an opposite direction. In the embodiment of the invention shown, the upper rollers 138 are cocked about 2°, so that, as viewed in plan FIGURE 10, there is a clearance between the upper roller and flange 121b, while the rollers 139 are cocked to provide clearance with flange portion 121a of beam 121.

To provide lateral stability of the carriage, the same is equipped, as seen in FIGURE 9, with two additional rollers 144, 144. These rollers are each carried on a stub shaft member 145 fixed to and extending from the rear face of apron 136. Such stub shafts are disposed adjacent the top end of the apron in line with rollers 138 and are so located on the apron that one of the rollers will contact and ride on one outside edge of the flange portion 121a of each of the I-beams 121. This relation may best be understood by examining FIGURE 9 of the drawings. Note, in this regard, that only two such stabilizing rollers 144 are used instead of a greater number as has been the practice in previous structures of this class. The reason for this lies in our discovery that a single roller engaging the outer side edge of each beam 121 will cooperate with a lower roller 139 on the inside of such beam to provide a couple tending to restrain the carriage from tilting sideways. The lateral forces will be taken therefore by a single upright 121 depending upon which side of the carriage is involved in the load problem.

The carriage assembly and the extensible upright sections 117 and 120 are operated through the medium of a pair of flexible link chains 150, 150, and an hydraulic ram mechanism 151. Each chain 150 is fastened at one end to a toggle member 152 associated with a piston crosshead assembly 153 (shown in large detail in FIGURES 17 and 18) engaged by the hydraulic ram 151 and comprising a cylinder 154 and an extensible piston rod 155. Each chain leads from the crosshead 153 downwardly to one of a pair of first idler sheave wheels 156, 156 mounted rotatably at the upper ends of upwardly extending rod members 157 fastened to a suitable base plate 158 associated with the outermost or stationary upright mast section 112. In this regard, the association of the chain and the idler wheels 156 will best be understood by inspecting FIGURE 7 of the drawings. After the chains pass over the idlers 156, which are fixed in their vertical position by rod members 157, the same are extended upwardly and train over a second set of idler sheave wheels 159 (see FIGURES 17 and 18) rotatably carried by the piston crosshead member 153 vertically above the connector means 152 which holds one end of the chains 150. A third set of idler wheels 160, as best shown in FIGURE 8, are attached to and disposed adjacent the lower end of the inner extensible mast section 120. The chain members 150 are trained under and over such wheels 160 after they leave the second set of idlers 159. From the wheel members 160, the chain members 150 extend upwardly to and around a pair of larger idler wheels 161 disposed adjacent the upper end of the inner section 120 and specifically rotatably supported on a top cross tie member 162 fixed to and between the upper end of the I-beams 121. The opposite or other end of the chains 150 are thereafter fixed to the load engaging assembly 135 adjacent the lower end of the apron 136 thereon. The particular chain and sheave wheel arrangement illustrated provides a normal ratio of movement between the load engaging assembly 135 and the movement of the piston actuated crosshead 153 at 3:1, as will be amplified in greater detail presently.

The crosshead assembly 153 is carried at one end of the piston rod 155 (see FIGURE 7) with the opposite end of such piston rod being housed in a hydraulic cylinder 154 of the ram assembly. To guide the crosshead in its movement with respect to the inner slide section 120, a guide means in the form of a pair of laterally spaced channel members 165, 165 are provided; the same being rigidly secured at their upper ends to the I-beams 121 by bracket members 166, 166 extending inwardly of the inner faces thereof, so that such channels 165 reside between the spaced rails 121, 121 and in parallelism therewith. The lower ends of the channel members 165 are secured to the lower cross tie 122, as best shown in FIGURE 7 of the drawings. The crosshead assembly 153, as seen in FIGURE 9, has a horizontal bar 167 having guide members 168 fixed to each end thereto by cap screws 169. During initial upward movement of the piston rod 155 and crosshead 153, the guide members 168 slide along the channels 165 to guide the crosshead. Upon lowering of the extensible mast section 120 and during the final raising of the same, to a fully extended position, the guide rails 165 move relative to their crosshead assembly 153 and serve to hold and guide the crosshead at all times.

The latch mechanism indicated generally at 170 forms the subject matter of our aforementioned patent, and reference may be had thereto for an example of a suitable form of latch mechanism for effecting raising and lowering of carriage 135, and related movement of the intermediate upright 117 relative to the stationary upright 112.

While we have herein shown the features of our improved mast assembly in association with a particular and preferred embodiment, it is nevertheless to be recognized that numerous changes, modifications and substitutions of equivalents may be made therein without necessarily departing from the spirit and scope of its inventive aspects. Therefore, it is not our intention to be limited to the particular form of the invention herein described and shown except as may appear in the following appended claims.

We claim:

1. Load lifting mechanism of the character described comprising a base, a pair of laterally spaced apart stationary uprights secured to said base, a pair of laterally spaced apart extensible uprights associated with said stationary uprights and movable longitudinally thereof, said extensible uprights having a portion thereof projecting forwardly of said stationary uprights, a load carriage, roller means comprising upper and lower guide rollers on said load-carriage at one side of said extensible uprights and in forward and lateral engagement therewith for guiding said carriage longitudinally of said extensible uprights, means positioned on said load carriage laterally to the other side of said extensible uprights but in lateral engagement with the forwardly projecting portion thereof, said last named means and said roller means being so constructed and arranged that any eccentric loading of said carriage will result in the side thrust thereof being at least primarily imposed on the extensible upright adjacent the minor portion of the load, and in the forward thrust thereof being at least primarily imposed upon the extensible upright adjacent the major portion of the load, and means for moving said load-carriage relative to said extensible uprights and said latter uprights relative to said stationary uprights.

2. Load lifting mechanism of the character described comprising a base, a pair of laterally spaced apart stationary uprights secured to said base, a pair of laterally spaced apart extensible uprights associated with said stationary uprights and movable longitudinally thereof, said extensible uprights having a portion thereof projecting forwardly of said stationary uprights, rollers positioned between said stationary uprights and said extensible uprights for guiding said extensible uprights in their movement relative to said stationary uprights, a load-carriage, upper and lower guide rollers on said load-carriage for guiding said carriage longitudinally of said extensible uprights, a pair only of additional thrust rollers positioned on said carriage, one each of said additional thrust rollers engaging the outer side face of the forwardly projecting portion of each of said extensible uprights, said additional thrust rollers and said upper and lower guide rollers being so constructed and arranged that any eccentric loading of said carriage will result in side thrust being imposed upon the extensible upright adjacent the minor portion of the load through the medium of an adjacent additional thrust roller and a lower guide roller of said carriage and in forward thrust being imposed upon the extensible upright adjacent the major portion of the load, and means for moving said load-carriage relative to said extensible uprights and the latter uprights relative to said stationary uprights.

3. Load lifting mechanism of the character described comprising a base, a pair of laterally spaced apart stationary uprights secured to said base, a pair of laterally spaced apart extensible uprights in the form of I-beams associated with said stationary uprights and movable longitudinally thereof, said I-beams having a portion thereof projecting forwardly of said stationary uprights, rollers positioned between said stationary uprights and said extensible uprights for guiding the latter in its movement relative to the stationary uprights, a load-carriage, upper and lower guide rollers on said carriage engaging said I-beams on one side thereof for guiding said carriage longitudinally of said extensible uprights, two only additional thrust rollers located adjacent the top of said carriage and engaging one of the flanges of said I-beams at the opposite side of the beams engaged by the upper and lower guide rollers of the carriage, whereby and eccentric loading of said carriage will result in side thrust being transmitted through one of said additional thrust rollers and an adjacent lower guide roller of said carriage to the I-beam adjacent the minor portion of the load and in forward thrust being imposed upon the I-beam adjacent the major portion of the load, and means for moving said load-carriage relative to said extensible uprights and the latter relative to said stationary uprights.

4. Load lifting mechanism of the character described comprising a base, a pair of laterally spaced apart stationary uprights secured to said base, a pair of laterally spaced apart extensible uprights associated with said stationary uprights in forwardly offset relation thereto and movable longitudinally thereof, rollers positioned between said stationary uprights and said extensible uprights for guiding said extensible uprights in their movement relative to said stationary uprights, a load-carriage, upper and lower guide rollers on said load-carriage for guiding said carriage longitudinally of said extensible uprights, said guide rollers all being cocked with the upper guide rollers being cocked in a direction opposite to the direction of cocking the lower guide rollers, a pair only of additional thrust rollers mounted on said load-carriage cooperating with the forwardly offset portion of said extensible uprights and effective therewith and with said lower guide rollers on said load-carriage to provide lateral stability to the latter, and means for moving said load-carriage relative to said extensible uprights and the latter relative to said stationary uprights.

5. Load lifting mechanism of the character described comprising a base, a pair of laterally spaced apart stationary uprights secured to said base, a pair of laterally spaced apart extensible uprights associated with said stationary uprights and movable longitudinally thereof, said extensible uprights having a portion thereof projecting forwardly of said stationary uprights, a pair of rollers on said stationary uprights adjacent the top thereof and a pair of rollers on said extensible uprights near the lower ends thereof, said rollers guiding said extensible uprights in their movement relative to said stationary uprights, said rollers all being cocked with respect to said uprights and the rollers on said stationary uprights being cocked in a direction opposite to the direction of cocking of the rollers on the extensible uprights, a load-carriage, upper and lower guide rollers on said load-carriage for guiding said carriage longitudinally of said extensible uprights, said guide rollers on the load-carriage all being cocked and with the upper guide rollers being cocked in a direction opposite to the direction of cocking of said lower guide rollers, a pair only of additional rollers located on said load-carriage and engaging the outer side face of the forwardly extending portion of said extensible uprights, each of said additional rollers cooperating with an adjacent cocked guide roller on said load carriage to impart lateral stability to the latter, and means for moving said load-carriage relatively to said extensible uprights and said latter uprights relative to said stationary uprights.

6. In a hoist mechanism for a lift truck, the combination comprising, a first frame section comprising a first pair of laterally spaced apart stationary uprights secured adjacent their lower ends to the lift truck, said uprights being of substantially channel cross-section and having their channels opening towards one another in opposed relationship, a second frame section comprising a second pair of laterally spaced apart extensible uprights disposed laterally inwardly of said first pair of stationary uprights and movable longitudinally thereof, said second pair of uprights being of substantialy I-shaped cross-section and nested one each in the channel of one each of said first pair of uprights in such a manner that one of the flanges of said second pair of uprights are disposed inwardly of the channels of said stationary uprights and with the other flanges of said second pair of uprights disposed outwardly of and overlapping the adjacent legs of said first pair of uprights, a roller on each of said first pair of uprights adjacent the upper ends thereof, a roller on each of said second pair of uprights near the lower ends thereof, and said rollers on said first pair of uprights being cocked in a direction opposite to the direction of cocking of the rollers on said second pair of uprights, said rollers guiding said second frame section in the movement of the same relative to said first frame section.

7. In a hoist mechanism for a lift truck, the combination comprising a first frame section comprising a first pair of laterally spaced apart stationary uprights secured adjacent their lower ends to the lift truck, said uprights being of substantially channel cross-section and having their channels opening towards one another in opposed relationship, a second frame section comprising a second pair of laterally spaced apart extensible uprights disposed laterally inwardly of said first pair of stationary uprights and movable longitudinally thereof, said second pair of uprights being of substantially I-shaped cross-section and nested one each in the channel of one each of said first pair of uprights in such a manner that one of the flanges of said second pair of uprights are disposed inwardly of the channels of said stationary uprights and with the other flanges of said second pair of uprights disposed outwardly of and overlapping the adjacent legs of said first pair of uprights, a roller on each of said first pair of uprights adjacent the upper ends thereof, a roller on each of said second pair of uprights near the lower ends thereof, said rollers on said first pair of uprights being cocked in a direction opposite to the direction of cocking of the rollers on said second pair of uprights, said rollers guiding said second frame section in the movement of the same relative to said first frame section, a load carriage, upper and lower rollers on said load carriage for guiding said carriage longitudinally of said second pair of uprights, and said rollers on said load carriage being cocked relative to said second pair of uprights, and with the upper rollers of said load carriage being cocked in a direction opposite to the direction of cocking of said lower rollers on said load carriage.

8. The combination of claim 7 wherein the carriage is provided with a pair only of side thrust rollers for engaging the longitudinal side edges of said second pair of uprights.

9. Load lifting mechanism of the character described comprising a base, a pair of laterally spaced apart stationary uprights secured to said base, a pair of laterally spaced apart extensible uprights associated with said stationary uprights and movable longitudinally thereof, said extensible uprights having a portion thereof extending forwardly of said stationary uprights, a pair of rollers on said stationary uprights adjacent the top thereof and a pair of rollers on said extensible uprights near the lower ends thereof, said rollers guiding said extensible uprights in their movement relative to said stationary uprights, a load-carriage, upper and lower cocked guide rollers on said load-carriage for guiding the latter longitudinally of said extensible uprights, a pair of additional rollers only mounted on said load-carriage, said latter rollers engaging the outer side face of the forwardly extending portion of said extensible uprights, each of said additional rollers cooperating with an adjacent cocked guide roller on said load-carriage to impart lateral stability to the latter, and means for moving said carriage relatively to said extensible upright and said latter uprights relative to said stationary uprights.

10. Load lifting mechanism of the character described comprising a base, a pair of laterally spaced apart stationary uprights secured to said base, a pair of laterally spaced apart extensible uprights associated with said stationary uprights and movable longitudinally thereof, said extensible uprights having a portion thereof projecting forwardly of said stationary uprights, rollers positioned between said stationary uprights and said extensible uprights for guiding said extensible uprights in their movement relative to said stationary uprights, a load carriage, upper and lower pairs of guide rollers on said load carriage for guiding said load carriage longitudinally of said extensible uprights, said guide rollers all being cocked with the upper guide rollers being cocked in a direction opposite to the direction of cocking of the lower guide rollers, a pair only of additional thrust rollers mounted on said load carriage cooperating with the forwardly offset portion of said extensible uprights and effective therewith and with one of said pairs of cocked rollers on said load carriage to provide lateral stability to the latter, and means for moving said load carriage relative to said extensible uprights and the latter relative to said stationary uprights.

11. In a hoist mechanism for lift trucks, a combination comprising a three-section load lifting frame wherein said sections are in telescoping relationship to one another, one of said sections having first and second flanges and a channel portion opening inwardly between said flanges said one secttion being secured adjacent its lower end to the lift truck, a second of said sections being of substantially I-shaped cross-section and nested with said one section with one end flange of said second section disposed in said channel portion in juxtaposition of and in overlapping relation to said first flange of said one section, and with the other end flange of said second section disposed outwardly of and in juxtaposed overlapping relation to said second flange of said one section, and the third of said sections being of substantially I-shaped cross-section and nested with said second section with one end flange of said third section disposed in juxtaposition of and in overlapping relation to said one flange of said second section, and with the other end flange of said third section disposed outwardly of and in juxtaposed overlapping relation with said second flange of said second section.

12. An extensible uprights for lift trucks of the character described, comprising a base, a pair of laterally spaced apart stationary uprights secured to said base, said uprights being of substantially channel cross-section and having their channels opening towards one another in opposed relationship, a first pair of laterally spaced apart extensible uprights disposed laterally inwardly of said stationary uprights and movable longitudinally thereof, said first pair of uprights being of substantially I-shaped cross-section, a portion of the flanges of said first pair of uprights being disposed in overlapping relation to the adjacent legs of the respective channel section uprights, and a second pair of laterally spaced apart extensible uprights disposed laterally inwardly of said first pair of extensible uprights and movable longitudinally thereof, said second pair of extensible uprights being of substantially I-shaped cross-section and having the flanges thereof disposed in overlapping relation with the respective adjacent flanges of the said first pair of extensible uprights.

13. An extensible upright for lift trucks as claimed in claim 12 wherein a first pair of rollers is located on said stationary uprights adjacent the upper ends thereof, a second pair of rollers is located on said first extensible uprights adjacent the lower ends thereof, a third pair of rollers is located on said first extensible uprights adjacent the upper ends thereof, and a fourth pair of rollers is located on said second extensible uprights adjacent the lower ends thereof, all of said rollers being cocked at an angle from a true transverse relation with respect to the longitudinal axis of the truck, said rollers guiding said extensible uprights in their movements relative to said stationary upright and to each other.

14. An extensible upright for lift trucks as claimed in claim 13 wherein the said first and third pairs of rollers are cocked in a direction opposite to the direction of cocking of said second and fourth pairs of rollers thereby to resist bending stress imposed upon the extensible uprights, a load carriage means mounted for longitudinal movement along said second pair of extensible uprights and relative to both pairs of said extensible uprights, and means for moving said carriage means relative to said extensible uprights and for moving said extensible uprights relative to said stationary uprights.

15. In a truck of the class described, a channel-shaped upright having a web and flanges, a second channel-shaped upright, a roller secured to said first upright adjacent one end thereof and extending into the channel of said second upright, a roller secured to said second upright adjacent one end thereof and extending into the channel of said first upright, said flanges on said uprights having cutaway portions adjacent each roller of a size to permit the rollers on each upright to move laterally into the channel of the other upright when said uprights are in their fully extended position and said cutaway portions are in a position of alignment with said rollers, thereby to permit assembly and disassembly of said uprights without removal of said rollers, a load carriage carried by said uprights, and power means for effecting relative vertical movement between said uprights and relative movement between said carriage and said uprights.

16. In a truck of the class described, a channel-shaped upright having a web and flanges, a second channel-shaped upright, a roller secured to said first upright adjacent one end thereof and extending into the channel of said second upright, a roller secured to said second upright adjacent one end thereof and extending into the channel of said first upright, said flanges on said uprights having cutaway portions adjacent each roller of a size to permit the roller on each upright to move laterally into the channel of the other uprights when said uprights are in their fully extended position and said cutaway portions are in a position of alignment with said rollers, thereby to permit assembly and disassembly of said uprights without removal of said rollers, a load carriage carried by said uprights, power means for effecting relative movement between said uprights and relative movement between said carriage and said uprights, and stop means acting normally to prevent said uprights from moving to said fully extended position whereby said uprights will not become disassembled.

17. In a hoist mechanism for a lift truck, the combination comprising, a first frame section comprising a first pair of laterally spaced apart stationary uprights secured adjacent their lower ends to the lift truck, said uprights each having a channel portion and forward and rearward leg portions, said uprights being arranged with their channel portions opening toward one another in opposed relationship, a second frame section comprising a second pair of laterally spaced apart extensible uprights disposed laterally inwardly of said first pair of stationary uprights and movable longitudinally thereof, said second pair of uprights being of substantially I-shaped cross-section, one of the flanges of said second pair of uprights being disposed inwardly of the channel portions of said stationary uprights and with the other flanges of said second pair of uprights disposed outwardly of and in overlapping relation to the forward leg portions of said first pair of uprights, cut-outs at the upper ends of the forward leg portions of said first pair of uprights, a roller on each of said first pair of uprights adjacent the upper ends thereof and projecting through said cut-outs and into the channel portions of said second pair of uprights, second cut-outs at the lower ends of the flanges of said second pair of uprights extending inwardly of the channel portions of said stationary uprights, and a roller on each of said second pair of uprights at said second cut-outs projecting therethrough and into the channel portions of said first pair of uprights, said rollers guiding said second frame section in movement of the same relative to said first frame section.

18. A hoist mechanism for lift trucks comprising a two section load lifting frame wherein said sections are in telescoping relation to one another, one of said sections having a channel portion opening inwardly and forward and rearward leg portions, the second of said sections being of substantially I-shaped cross-section and nested with said one section in such a manner that one end flange of the I-shaped section is disposed outwardly of said forward leg portion and the other end flange is disposed inwardly of said channel portion, cut-outs formed in said forward leg portion of said one section and in said other end flange of said second section, and rollers arranged between said one section and said I-shaped section at and projecting through said cut-outs for riding in said channel portion and said I-shaped section facing said channel portion for guiding said I-shaped section for movement relative to said one section.

19. A hoist mechanism for lift trucks comprising a two-section load lifting frame wherein said sections are in telescoping relation to one another, one of said sections being of substantially channel-shaped cross section with the channel portion thereof opening inwardly and having forward and rearward leg portions, said one section being secured adjacent its lower end to the lift truck, the second of said sections being substantially I-shaped cross-section and nested with said one section in such a manner that the one end flange of the I-shaped section is disposed outwardly of said forward leg portion and the other end flange is disposed inwardly of said channel portion, cut-outs formed in said forward leg portion of said one section and in said other end flange of said second section, and rollers arranged between said one section and said I-shaped section at and projecting through said cut-outs for riding in said channel portion and said I-shaped section facing said channel portion for guiding said I-shaped section for movement relative to said one section.

20. A hoist mechanism for lift trucks comprising a two section load lifting frame wherein said sections are in telescoping relation to one another, one of said sections having a channel portion opening inwardly and forward and rearward leg portions, said one section being secured adjacent its lower end to the lift truck, the second of said sections being of substantially I-shaped cross-section and nested with said one section in such a manner that one end flange of the I-shaped section is disposed outwardly of said forward leg portion and the other end flange is disposed inwardly of said channel portion, a first cut-out at the lower end of said other flange of said I-shaped section, a first roller mounted at said lower end of said I-shaped section projecting through the cut-out thereof and into said channel portion of said one section, a second cut-out at the upper end of said forward leg portion of said one section, and a second roller mounted at said second cut-out projecting therethrough and into the channel of said I-shaped section facing the channel portion of said one section, said first and second rollers guiding said I-shaped section for movement relative to said one section.

21. In a hoist mechanism for lift trucks, the combination comprising a three-section load lifting frame wherein said sections are in telescoping relationship to one another, one of said sections having a channel portion opening inwardly and forward and rearward leg portions, said one section being secured adjacent its lower end to the lift truck, a second of said sections being of substantially I-shaped cross-section and nested with said first section in such a manner that one of the flanges of said second section is disposed outside of the forward leg portion of said first section and the other of the flanges disposed in the channel portion of said first section, cut-outs at the upper end of said forward leg portion of said first section and at the lower end of said other flange of said second section, rollers at said cut-outs projecting therethrough and into the channels of said first and second sections for guiding said second section for movement relative to said first section, and the third of said sections being of substantially I-shaped cross-section and nested with said second section in such a manner that one of the flanges of said third section is disposed outside of said one flange of said second section and the other flange of said third section is disposed in the channel portion of said second section, second cut-outs at the upper end of said one flange of said second section and at the lower end of said other flange of said third section, and rollers at said second cut-outs projecting therethrough and into the channels of said second and third sections for guiding said second and third sections for movement relative to each other.

22. In a hoist mechanism for a lift truck the combination comprising a first frame section comprising a first pair of laterally spaced apart extensible uprights, said first pair of uprights being of substantially I-shaped cross-section and having inner and outer channel portions between forward and rearward end flanges thereof, a second frame section comprising a second pair of laterally spaced apart extensible uprights disposed laterally inwardly of said first pair of uprights and movable longitudinally thereof, said second pair of uprights being of substantially I-shaped cross-section and having outer and inner channel portions between forward and rearward end flanges thereof, said rearward end flanges of said second pair of uprights being disposed inwardly of the inner channel portions of said first pair of uprights in juxtaposed overlapping relation with respect to said rearward end flanges of said first pair of uprights and with the forward end flanges of said second pair of uprights disposed outwardly of and in overlapping relation to the forward flanges of said first pair of uprights, cut-outs in the forward flanges of said first pair of uprights opening into the inner channel portions thereof, and roller means between said first and second pairs of uprights including rollers projecting through said cut-outs and into the outer channel portions of said second pair of uprights for guiding said first and second frame sections in movement of the same relative to each other.

23. In a hoist mechanism for a lift truck the combination comprising, a first frame section comprising a first pair of laterally spaced apart stationary uprights mounted adjacent their lower ends to the lift truck, said uprights each having a channel portion and being arranged with their channel portions opening toward one another in opposed relationship, a second frame section comprising a second pair of laterally spaced apart extensible uprights disposed laterally inwardly of said first pair of stationary uprights and movable longitudinally thereof, said second pair of uprights being of substantially I-shaped cross-section and having outer and inner channel portions, first roller means between the channel portions of said first pair of stationary uprights and the outer channel portions of said second pair of uprights for guiding said second frame section in movement of the same relative to said first frame section, a third frame section comprising a third pair of laterally spaced apart extensible uprights disposed laterally inwardly of said second pair of uprights and movable longitudinally thereof, said third pair of uprights being of substantially I-shaped cross-section and having outer and inner channel portions, one of the flanges of said third pair of uprights being disposed inwardly of the inner channel portions of said second pair of uprights and with the other flanges of said third pair of uprights disposed outwardly of and in overlapping relation to the forward flange of said second pair of uprights, cut-outs in the forward flanges of said second pair of uprights opening into the inner channel portions thereof, and second roller means between said second and third pair of uprights including second rollers projecting through said cut-outs and into the outer channel portions of said third pair of uprights for guiding said second and third frame sections in movement of the same relative to each other.

24. A load lifting frame for a lift truck comprising outer and inner load lifting sections arranged in telescoping relation with respect to each other, said outer section having forward and rearward upright flanges defining a channel portion therebetween, said inner section having an upright flange disposed in said channel portion with its outer surface in juxtaposed overlapping relation with respect to the inner surface of said rearward flange of said outer section, a first cut-out at the lower end of said flange of said inner section, a second cut-out at the upper end of said forward flange of said outer section, a first roller journalled at the lower end of said inner section and extending through said first cut-out into said channel portion of and in rolling engagement with the inner surface of said rearward flange of said outer section, a second roller journalled at the upper end of said outer section, extending through said second cut-out and being in rolling engagement with the inner surface of said flange of said inner section, and said cut-outs being of a size to permit the rollers on each section to move laterally through the cut-out in the flange of the other section when said sections are in their fully extended positions and said cut-outs are in position of alignment with said rollers thereby to permit assembly and disassembly of said sections without removal of said rollers.

25. A load lifting upright for lift trucks comprising a first outer frame section adapted to be secured adjacent its lower end to lift truck and having a pair of laterally spaced-apart uprights with forward and rearward end flanges forming a pair of inner opposed channel portions therebetween, a second frame section arranged in telescoping relationship to the first frame section and having a second pair of laterally spaced-apart extensible uprights disposed laterally inwardly of said first pair of uprights and movable longitudinally thereof, said second pair of uprights each being of substantially I-shaped cross-section and having forward and rearward end flanges with outer and inner channel portions formed therebetween, said forward end flanges of said second pair of uprights being substantially co-planar with each other and said rearward end flanges of said second pair of uprights being substantially co-planar with each other, the outwardly projecting portions of said rearward end flanges of said second pair of uprights being disposed inwardly of the channel portions of said first pair of uprights in juxtaposed overlapping and forwardly offset relation with respect to said rearward end flanges of said first pair of uprights and the outwardly projecting portions of said forward end flanges of said second pair of uprights being disposed forwardly of and in juxtaposed overlapping relation with respect to said forward flanges of said first pair of uprights, said forwardly offset relation between the pairs of rearward end flanges of said first and second pairs of uprights providing a space therebetween which extends longitudinally and transversely of the truck, and a load-carriage extending forwardly of the second frame section and mounted in the inner channel portions of said second pair of uprights for longitudinal movement relative to said second pair of uprights.

26. A load lifting upright for lift trucks comprising a first frame section having a first pair of laterally spaced-apart extensible uprights, said first pair of uprights being of substantially I-shaped cross-section and having forward and rearward end flanges with outer and inner channel portions formed therebetween, a second frame section comprising a second pair of laterally spaced-apart extensible uprights disposed laterally inwardly of said first pair of uprights and movable longitudinally thereof, said second pair of uprights each being of substantially I-shaped cross-section and having forward and rearward end flanges with outer and inner channel portions formed therebetween, said forward end flanges of said second pair of uprights being substantially co-planar with each other and said rearward end flanges of said second pair of uprights being substantially co-planar with each other, the outwardly projecting portions of said rearward end flanges of said second pair of uprights being disposed inwardly of the inner channel portions of said first pair of uprights in juxtaposed overlapping and forwardly offset relation with respect to said rearward end flanges of said first pair of uprights and the outwardly projecting portions of said forward end flanges of said second pair of uprights being disposed forwardly of and in juxtaposed overlapping relation with respect to said forward flanges of said first pair of uprights, said forwardly offset relation between the pairs of rearward end flanges of said first and second pairs of uprights providing a space therebetween which extends longitudinally and transversely of the truck, and a load-carriage extending forwardly of the second frame section and mounted in the inner channel portions of said second pair of uprights for longitudinal movement relative to said second pair of uprights.

27. A load lifting upright as claimed in claim 25 characterized further by a first pair of cut-outs in said outwardly projecting portions of said rearward end flanges of said second pair of uprights, a second pair of cut-outs in said forward end flanges of said first pair of uprights, a first pair of rollers extending through said first pair of cut-outs into said opposed channel portions of and in rolling engagement with said rearward end flanges of said first pair of uprights, and a second pair of rollers extending through said second pair of cut-outs and being in rolling engagement with said outwardly projecting portions of said rearward end flanges of said second pair of uprights.

28. A load lifting upright as claimed in claim 27 wherein said first pair of cut-outs are located at the lower ends of said rearward end flanges, said second pair of cut-outs are located at the upper ends of said forward end flanges, said first pair of rollers are journaled at the lower ends of said second pair of uprights, and said second pair of rollers are journaled at the upper ends of said first pair of uprights.

References Cited by the Examiner

UNITED STATES PATENTS

| | | | |
|---|---|---|---|
| 717,701 | 1/03 | Murphy. | |
| 854,961 | 5/07 | McCarthy | 187—95 X |
| 1,409,906 | 3/22 | Boehck | 187—11 |
| 1,549,029 | 8/25 | Remde | 187—11 |
| 1,613,901 | 1/27 | Perrish. | |
| 1,667,547 | 4/28 | Green | 187—95 X |
| 2,050,821 | 8/36 | Vercoe | 214—513 |
| 2,080,304 | 5/37 | Cochran | 187—11 |
| 2,177,941 | 10/39 | Knudson et al. | 212—27 |
| 2,261,930 | 11/41 | Abbe | 187—9 |
| 2,298,196 | 10/42 | Cochran | 214—671 |
| 2,321,029 | 6/43 | Johnson | 187—95 X |
| 2,434,002 | 1/48 | Moore | 187—11 |
| 2,528,401 | 10/50 | Ulinski | 187—9 |
| 2,581,791 | 1/52 | Gilman | 187—9 |
| 2,595,120 | 4/52 | Barnes | 187—9 |
| 2,642,157 | 6/53 | Milz | 187—9 |
| 2,759,562 | 8/56 | Ulinski | 187—9 |
| 2,759,563 | 8/56 | Marnon et al. | 187—9 |
| 2,787,343 | 4/57 | Mitchell | 187—11 |
| 2,918,143 | 12/59 | Shaffer | 187—9 |
| 2,936,047 | 5/60 | Quayle | 187—95 |
| 2,941,685 | 6/60 | McCune | 187—11 X |

SAMUEL F. COLEMAN, *Primary Examiner.*

RALPH H. BRAUNER, ANDRES H. NIELSEN,
*Examiners.*